(12) United States Patent
O'Donnell et al.

(10) Patent No.: US 8,193,965 B2
(45) Date of Patent: Jun. 5, 2012

(54) FORWARD-LOOKING DETECTION RADAR

(75) Inventors: Daniel J. O'Donnell, Orlando, FL (US);
Donald Wright, Orlando, FL (US);
Debra D. Weber, Tampa, FL (US)

(73) Assignee: L-3 Communications CyTerra Corporation, Orlando, FL (US)

( * ) Notice: Subject to any disclaimer, the term of this patent is extended or adjusted under 35 U.S.C. 154(b) by 869 days.

(21) Appl. No.: 12/272,927

(22) Filed: Nov. 18, 2008

(65) Prior Publication Data

US 2012/0062407 A1      Mar. 15, 2012

Related U.S. Application Data

(60) Provisional application No. 60/988,894, filed on Nov. 19, 2007.

(51) Int. Cl.
*G01S 13/00*          (2006.01)

(52) U.S. Cl. ............................................ 342/22; 342/27
(58) Field of Classification Search .................. 342/22, 342/27
See application file for complete search history.

(56) References Cited

U.S. PATENT DOCUMENTS

2006/0190124 A1 *  8/2006  Makela ................... 700/213
2009/0040093 A1 *  2/2009  Holly et al. .............. 342/22

* cited by examiner

*Primary Examiner* — Timothy A Brainard
(74) *Attorney, Agent, or Firm* — Fish & Richardson P.C.

(57) ABSTRACT

An explosive detection system includes an unmanned vehicle and a manned vehicle. The unmanned vehicle includes a reflector. The manned vehicle includes a ground penetrating radar. The manned vehicle also includes electronics configured to process radar signals that are reflected by the reflector to detect an explosive device. The manned vehicle follows the unmanned vehicle.

4 Claims, 1 Drawing Sheet

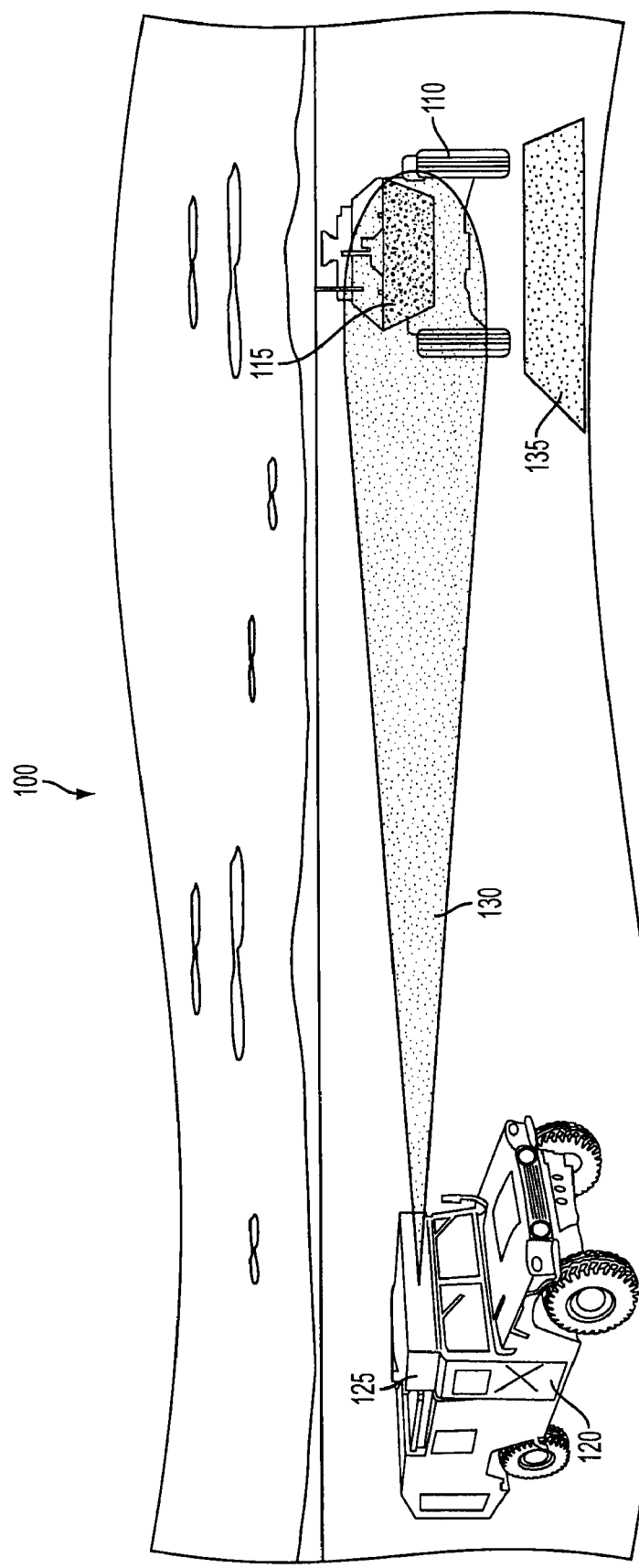

FORWARD-LOOKING DETECTION RADAR

CROSS REFERENCE TO RELATED APPLICATIONS

This application claims the benefit of U.S. Provisional Application No. 60/988,894, filed Nov. 19, 2007, and titled FORWARD-LOOKING DETECTION RADAR, which is incorporated by reference in its entirety.

TECHNICAL FIELD

This description relates to detection of explosives or other dangerous materials.

BACKGROUND

Landmines are area denial weapons and are intended to slow, re-direct or obstruct the mobility of military forces.

SUMMARY

In one general aspect, an explosive detection system includes an unmanned vehicle and a manned vehicle. The unmanned vehicle includes a reflector. The manned vehicle includes a ground penetrating radar. The manned vehicle also includes electronics configured to process radar signals that are reflected by the reflector to detect an explosive device. The manned vehicle follows the unmanned vehicle. Implementations of the unmanned vehicle may include, for example, an unmanned ground vehicle, an unmanned aerial vehicle or a robot.

Implementations of the techniques discussed above may include a method or process, a system or apparatus, or computer software on a computer-accessible medium. Other features will be apparent from the following description, including the drawings, and the claims.

DESCRIPTION OF DRAWINGS

FIG. 1 is a diagram of an example forward-looking detection radar system.

DETAILED DESCRIPTION

Military forces are threatened by so-called improvised explosive devices ("IEDs") and surface explosively formed projectiles ("EFPs"). IEDs and EFPs pose a significant threat to armed forces and others in combat zones or other unstable areas. One approach to detecting an IED or EFP is the use of a soldier's eyes. Using a person's eyes to detect IED and EFP explosive threats generally provides a limited standoff range and slows advance rate to ensure high probability of detection.

Another approach to detecting IEDs and EFPs is use of downward-looking ground penetrating radars ("GPRs"). A downward-looking GPR generally is only able to achieve short standoff range, such as a range measured in tens of feet. A downward-looking GPR generally is driven by grazing angle requirements to get energy penetration into ground. A downward-looking GPR also generally has a high false alarm rate to get high probability of detection, even at short range. A downward-looking GPR also generally has a short detection range, which places the vehicle, occupants and expensive electronics inside the lethal blast radius of the IED or EFP. One way to achieve better ground penetration when using a downward-looking GPR is to place radar on a tall mast. This often is not practical because of the height required to get a long standoff range. For example, a 30 meter height is required to get 100 meter standoff.

A forward-looking IED detection radar may be used to detect buried IEDs and/or surface EFPs. FIG. 1 depicts an example forward-looking IED detection radar system 100. The radar system 100 includes a leading unmanned vehicle 110 having a reflector 115. The radar system 100 also includes a trailing manned vehicle 120 having a ground penetrating radar system 125. The trailing manned vehicle 120 also includes signal processing electronics and a controller for the unmanned vehicle 110. In general, an occupant(s) of the manned trailing vehicle 120 controls the speed and direction of the unmanned lead vehicle 110 and monitors the signal processing electronics of the ground penetrating radar system 125 to detect an IED or EFP.

More particularly, the radar 125 on the manned vehicle 120 sends signals 130 toward the reflector 115 on the unmanned vehicle 110. The reflector 115 on the unmanned vehicle 110 reflects the radar signals toward the ground using a steep grazing angle. The ground area 135 illustrates the ground area covered by the reflected radar signals. The signal processing electronics in the manned vehicle processes the signals in the ground area 135 to determine whether an IED or EFP is within the ground area 135. Generally, both the reflector 115 and radiating/receiving antenna(s) of the ground penetration radar 125 are instrumented to facilitate x, y, z motion measurements, which may help to enable motion compensation for image formation.

In the example of FIG. 1, the unmanned vehicle 110 is an unmanned ground vehicle (UGV), though the lead vehicle need not necessarily be an unmanned ground vehicle. In some implementations, the unmanned vehicle may be, for example, an unmanned aerial vehicle (UAV). Additionally or alternatively, the unmanned vehicle 110 traveling ahead of the manned vehicle need not necessarily be a vehicle. For example, the leading device may be a robot.

In some implementations, the reflector 115 may be capable of enabling beam scanning to increase ground coverage area. The reflector may be mounted in such a way as to allow change in angle in order to increase ground coverage area. Additionally or alternatively, the forward-looking IED detection radar may use additional reflectors to increase the ground area covered. For example, additional reflectors may be used on the unmanned vehicle to cover the roadsides for detection of EFPs.

Additionally or alternatively, the trailing vehicle 120 may be equipped to measure the relative distance to the lead vehicle reflector using a precision range measurement sensor (e.g., laser).

Radar may provide sufficient range measurement accuracy. Additional sensors can be implemented to improve overall IED and EFP detection performance, for example, to increase probability of detection and/or reduce probability of false alarm. Examples of sensors that may be used include infrared, electro-optical, and metal detector (e.g., EMI, gradiometer). Sensors may be implemented on the unmanned leading vehicle 110 and/or the manned trailing vehicle 120. The data link between leading and trailing vehicle may need to be more capable for different types of sensors and depending on whether sensors are positioned on the leading vehicle, the trailing vehicle or both.

Compensation may be provided for motion of both the radar antenna and the reflector. Measurement of motion may be sufficiently accurate to provide imaging as good as down-looking GPRs.

Techniques may be provided to reduce multi-path interference. In one example of multi-path interference, ground bounce path to the reflector may be coherently combined with the direct path to the reflector to degrade image quality. The wideband nature of the radar is used to mitigate this effect and provide acceptable performance.

Implementations of a forward-looking IED radar may provide one or more of the following advantages. The forward-looking IED radar may provide excellent ground penetration of microwave signals for detection of landmines and IEDs. The forward-looking IED radar uses a steep grazing angle, which provides long standoff range. For example, some implementations of forward-looking IED radar may provide a range of up to around 100 meters and, in some implementations, more than 100 meters. The manned vehicle, its occupants and its expensive electronics remain outside lethal blast range of detected IEDs. A lead unmanned vehicle, which is exposed to explosive hazards, can be inexpensive and light. Heavier vehicles may be used to set off certain pressure-activated mines or IEDs. A forward-looking IED radar system may achieve relatively fast advance rates, for example, 30-60 mph. A low profile radar antenna may be used in the manned vehicle.

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An explosive detection system comprising:
   an unmanned vehicle with a reflector;
   a manned vehicle with a ground penetrating radar and electronics configured to process radar signals that are reflected by the reflector to detect an explosive device, wherein:
   the manned vehicle follows the unmanned vehicle.

2. The system of claim 1 wherein the unmanned vehicle comprises an unmanned ground vehicle.

3. The system of claim 1 wherein the unmanned vehicle comprises an unmanned aerial vehicle.

4. The system of claim 1 wherein the unmanned vehicle comprises a robot.

* * * * *